United States Patent
Trigiani

(10) Patent No.: US 8,547,065 B2
(45) Date of Patent: Oct. 1, 2013

(54) BATTERY MANAGEMENT SYSTEM

(76) Inventor: Antonio Trigiani, Bristol, TN (US)

( * ) Notice: Subject to any disclaimer, the term of this patent is extended or adjusted under 35 U.S.C. 154(b) by 947 days.

(21) Appl. No.: 12/331,717

(22) Filed: Dec. 10, 2008

(65) Prior Publication Data
US 2009/0146610 A1    Jun. 11, 2009

Related U.S. Application Data

(60) Provisional application No. 61/012,907, filed on Dec. 11, 2007.

(51) Int. Cl.
*H02J 7/00* (2006.01)

(52) U.S. Cl.
USPC .......................................... 320/119; 320/118

(58) Field of Classification Search
None
See application file for complete search history.

(56) References Cited

U.S. PATENT DOCUMENTS

| | | | |
|---|---|---|---|
| 5,542,425 A | 8/1996 | Marshall et al. | |
| 5,710,506 A | 1/1998 | Broell et al. | |
| 6,150,795 A | 11/2000 | Kutkut et al. | |
| 6,184,656 B1 * | 2/2001 | Karunasiri et al. | 320/119 |
| 6,225,153 B1 | 5/2001 | Neblett et al. | |
| 6,288,522 B1 * | 9/2001 | Odaohhara et al. | 320/138 |
| 6,369,546 B1 | 4/2002 | Canter | |
| 6,404,166 B1 * | 6/2002 | Puchianu | 320/116 |
| 6,586,909 B1 | 7/2003 | Trepka | |
| 6,642,693 B2 | 11/2003 | Anzawa et al. | |
| 6,777,908 B2 | 8/2004 | Thorne et al. | |
| 6,793,510 B2 | 9/2004 | Yamakawa et al. | |
| 6,801,014 B1 | 10/2004 | Chitsazan et al. | |
| 7,021,950 B2 | 4/2006 | Borrego Bel et al. | |
| 7,066,749 B2 | 6/2006 | Borrego Bel et al. | |
| 7,245,108 B2 | 7/2007 | Chertok et al. | |
| 2003/0034780 A1 | 2/2003 | Vacher | |
| 2006/0097700 A1 | 5/2006 | Studyvin et al. | |
| 2006/0152189 A1 * | 7/2006 | Ambrosio et al. | 320/104 |
| 2010/0010769 A1 | 1/2010 | Houldsworth | |

FOREIGN PATENT DOCUMENTS

WO    WO 2008/051979    5/2008

OTHER PUBLICATIONS

International Search Report (ISR) and Written Opinion (WO) for International Application No. PCT/US2008/86192, mailed date Feb. 2, 2009.

* cited by examiner

*Primary Examiner* — Edward Tso
*Assistant Examiner* — Robert Grant
(74) *Attorney, Agent, or Firm* — Knox Patents; Thomas A. Kulaga

(57) ABSTRACT

Apparatus for a modular battery management system with interchangeable slave modules connected to each cell and including a master module controlling and managing the battery system. All the modules receive power through a transfer switch that selectively switches between an external source, an auxiliary source, and the battery. The modules are configured to connect to a cell of the battery for charging and monitoring the cell individually. Each module is electrically isolated from the other modules. The modules are autonomous and shut down the battery and disconnect the module when a critical parameter of the cell is reached. When the battery is in service and a cell parameter approaches the critical level, the master controller instructs the corresponding slave module to charge the cell using battery power. The master module initializes the slave modules to uniquely identify the modules.

22 Claims, 6 Drawing Sheets

BATTERY MANAGEMENT SYSTEM

CROSS-REFERENCE TO RELATED APPLICATIONS

This application claims the benefit of U.S. Provisional Application No. 61/012,907, filed Dec. 11, 2007.

STATEMENT REGARDING FEDERALLY SPONSORED RESEARCH OR DEVELOPMENT

Not Applicable

BACKGROUND OF THE INVENTION

1. Field of Invention

This invention pertains to a battery management system for a multi-cell battery.

2. Description of the Related Art

Portable power sources are becoming ubiquitous. Batteries provide operating power to many portable devices, from handheld devices to electric vehicles. As the portable devices become more powerful and greater demands are placed on them, so too must the power supply be able to provide the power needed by those devices.

Traditionally, batteries were charged as a unit. That is, a single battery charger charged all the cells in their connected configuration. This arrangement, although simple to implement, is inefficient. Typically, the cells in a multi-cell battery do not all have the same state of charge before and after charging. If one cell has a higher state of charge before charging, then that cell may be overcharged by bringing up the other cells to a full charge state. Or, that cell may be fully charged, but the cells that started at a lesser charge state are not fully charged. Either situation is not desirable.

Attempts have been made to provide even charging of battery cells and/or to equalize the charge between cells. For example, Published Application Number 2006/0097700 discloses a battery with most of the series connected cells 320-335 having a charging source 305-315, a shunt regulator 350-360, and a cell monitor 380-395. The charging sources 305-315 are used one at a time with the shunt regulators 350-360 isolating the cells that are not to be charged. U.S. Pat. No. 6,150,795 discloses a single charge source 32 connected to a battery with series connected cells 31. Parallel with the cells 31 are equalizer diverter modules 36 that equalize the charge on the cells 31.

Another example is U.S. Pat. No. 6,369,546, which discloses an array of cell units 12 for an orbiting satellite The cell units 12 are grouped into cells 14 of parallel connected cell units 12. Each group of parallel connected cell units 12 has a charging circuit 26 and a bypass switch 28. A single bulk charger 16 charges all the cells 14 at a high rate and then equalization/balancing is performed by a plurality of balancing switches 22 connected to corresponding transformer/rectifier circuits 26 that provide individual equalization of the cells 14. U.S. Pat. No. 6,586,909 discloses isolated regulators 26 connected to each cell 40 of a battery 30. The charging system uses a multiple-winding transformer 20 to supply regulators 26 connected to the individual cells 40, or group of cells. Each regulator is supplied power from a single winding 22 of the multiple-winding transformer 20.

BRIEF SUMMARY OF THE INVENTION

According to one embodiment of the present invention, a modular battery management system with interchangeable modules connected to each cell and including a master module controlling and managing the battery system. Such a system is a scalable battery management system that allows easy replacement and maintenance. In addition, the system is readily configurable to various size battery systems.

The battery management system includes a master module and a multitude of slave modules that are controlled by the master module. Each of the modules is associated with one or more cells forming a battery. Each module includes an isolated charging circuit, a monitoring circuit for measuring cell parameters, a module disconnect switch, and a controller connected to a communications port. The master module further includes a monitoring circuit that monitors battery parameters and circuits for a load disconnect switch and a transfer switch. The load disconnect switch isolates the load from the battery. The transfer switch selectively connects the battery, the modules, and an external power source.

In one embodiment, each module, including the master and the slave modules, has a cell charging circuit that is isolated from its power source. In one embodiment, the cell charging circuit is magnetically coupled to an input power circuit that receives power from either an external source or the battery. The magnetic coupling isolates the charging circuit and allows the charging circuit to be configured to the voltage of the cell. When the input power circuit is connected to the external source by the transfer switch, each cell is charged by its corresponding charging circuit independently of the other cells in the battery. When the input power circuit is connected to the battery by the transfer switch, the cell charging circuit uses the battery power to charge its associated cell if the cell voltage drops below a threshold. No battery power is lost as heat because equalizing shunts are not required. In one embodiment, the cell is charged only if certain or specified battery parameters are within specified limits.

Each module also includes a cell monitoring circuit, a cell disconnect, and a communications port. The cell monitoring circuit measures various parameters of the cell. In various embodiments, these parameters include one or more of temperature, voltage, current, and amp-hour capacity. The cell, or module, disconnect isolates the cell from the module upon a signal from the master module when the voltage of the cell falls below a setpoint value. The communications port provides communications between the slave modules and the master module. In various embodiments, the communications ports are connected in a daisy chain, a star, a ring, or a bus configuration.

The master module also includes a load disconnect switch circuit, a transfer switch circuit, and a master controller and display unit. The load disconnect switch circuit operates the load disconnect switch upon a command from the master controller, for example, when the voltage of one cell falls below a threshold value indicating that further use will damage that cell, but only after the battery management system attempts to balance the cells of the battery. The transfer switch circuit operates the transfer switch that connects the various modules to either the battery, an auxiliary power supply, or an external power supply, or source.

In one embodiment, the master module is associated with the first cell, which is positioned adjacent the negative, or earth, lead of the battery. Upon initialization of the system, the master module communicates with the slave modules and assigns an identification code to each slave module based upon its location in the battery. The identification code is assigned when the battery is initialized, allowing the number of cells to vary between applications with the slave modules uniquely associated with a cell. The identification code is displayed for defective or poorly performing cells to allow easy identification of the cell for maintenance.

In the embodiment described above, the master module includes the functions of a slave module because the master module is connected to a cell and must monitor and charge that cell. In other embodiments, the functions of the slave module are separated from the master module and the master module is connected to the battery, one or more cells, or an independent power supply. In such an embodiment, the master module does not include a charging circuit. Also, the master module has a battery monitoring circuit for monitoring the parameters of the battery.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for a battery management system 100 is disclosed. Rechargeable batteries and cells attain a longer life with greater capacity when the battery and its cells are charged and discharged within its optimal operating parameters. Charging or discharging individual cells or groups of cells allows the battery or battery pack to not be limited by a cell that was not fully charged or does not have the capacity of the other cells. The battery management system features include charging, cell equalization, load controlling, load monitoring and protection, and battery pack management.

Charging returns a cell to a specified state of charge. Cell equalization is balancing the cells in a battery such that the cells have the same voltage and/or state of charge, within limits. Load controlling is control of the load, such as with a motor controller. Load monitoring and protection is measuring the parameters of the load and ensuring that the parameters remain within limits. Battery pack management includes ensuring that no cell is operated outside its limits, thereby ensuring that the cell is not damaged by over-discharging or over-charging, which will ensure that the battery life is maximized. The apparatus also creates and fosters a symbiotic relationship between load and energy source in that by monitoring the load and energy source the battery pack is protected from excessive loads and over-discharging, and the load benefits by balancing cells and delivering its maximum capacity to the load.

Figure 1:
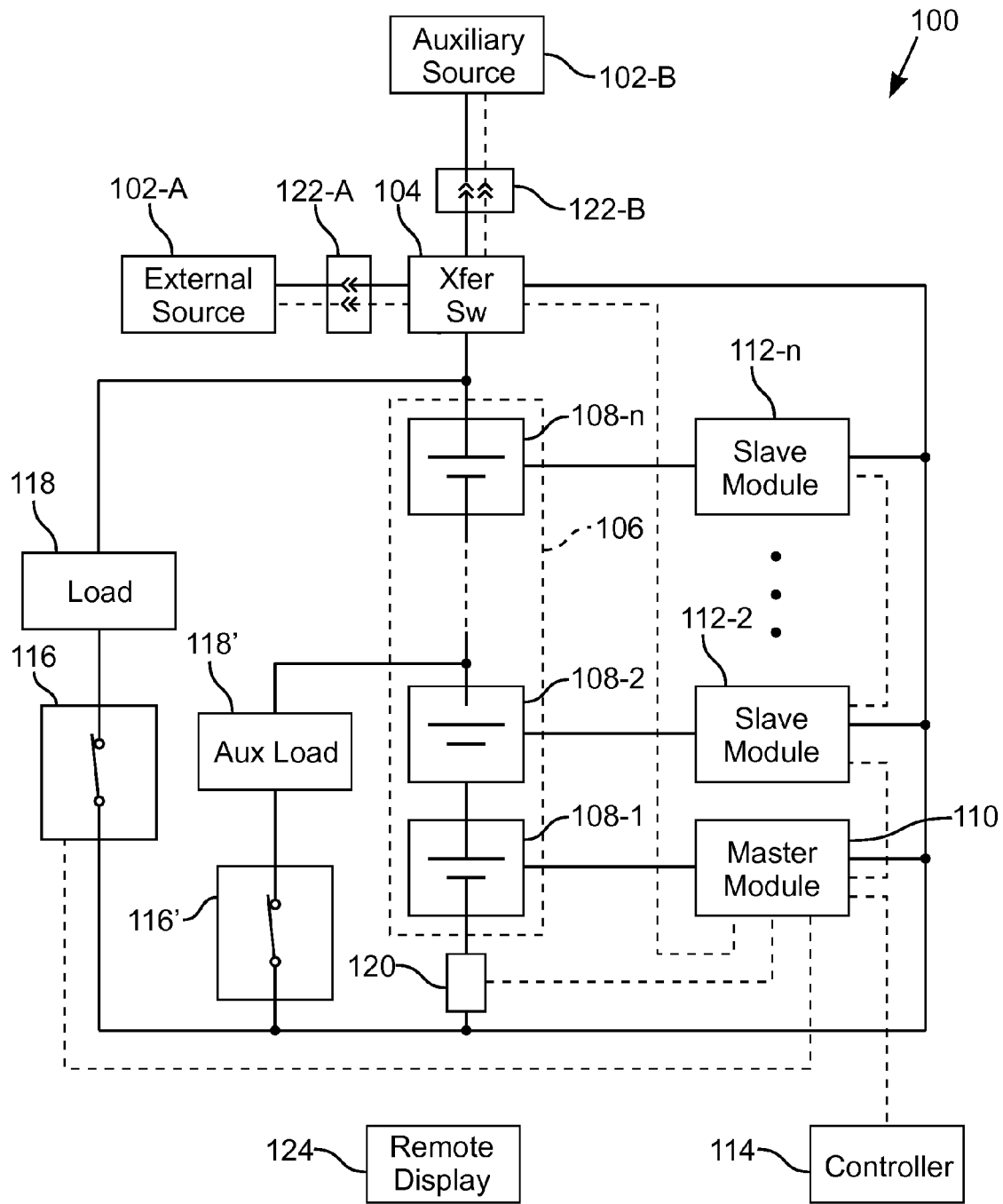
FIG. 1 is a simplified schematic diagram of one embodiment of a battery management system.

FIG. 1 illustrates a simplified schematic diagram of one embodiment of a battery management system 100. The illustrated embodiment of the system 100 includes a battery 106 with a plurality of series connected cells 108. In various embodiments, the cells 108 are individual battery units of one cell or a collection of battery units with cells in a parallel configuration, such as another battery cell. For example, if increased energy capacity is desired, multiple individual cells are connected in parallel and considered to be a single cell 108 in the illustration. If increased voltage is desired, multiple individual cells are connected in series and considered to be a single cell 108 in the illustration. As used herein, a cell 108 refers to a battery unit, which includes one or more single cells connected in series and/or parallel.

Figure 3:
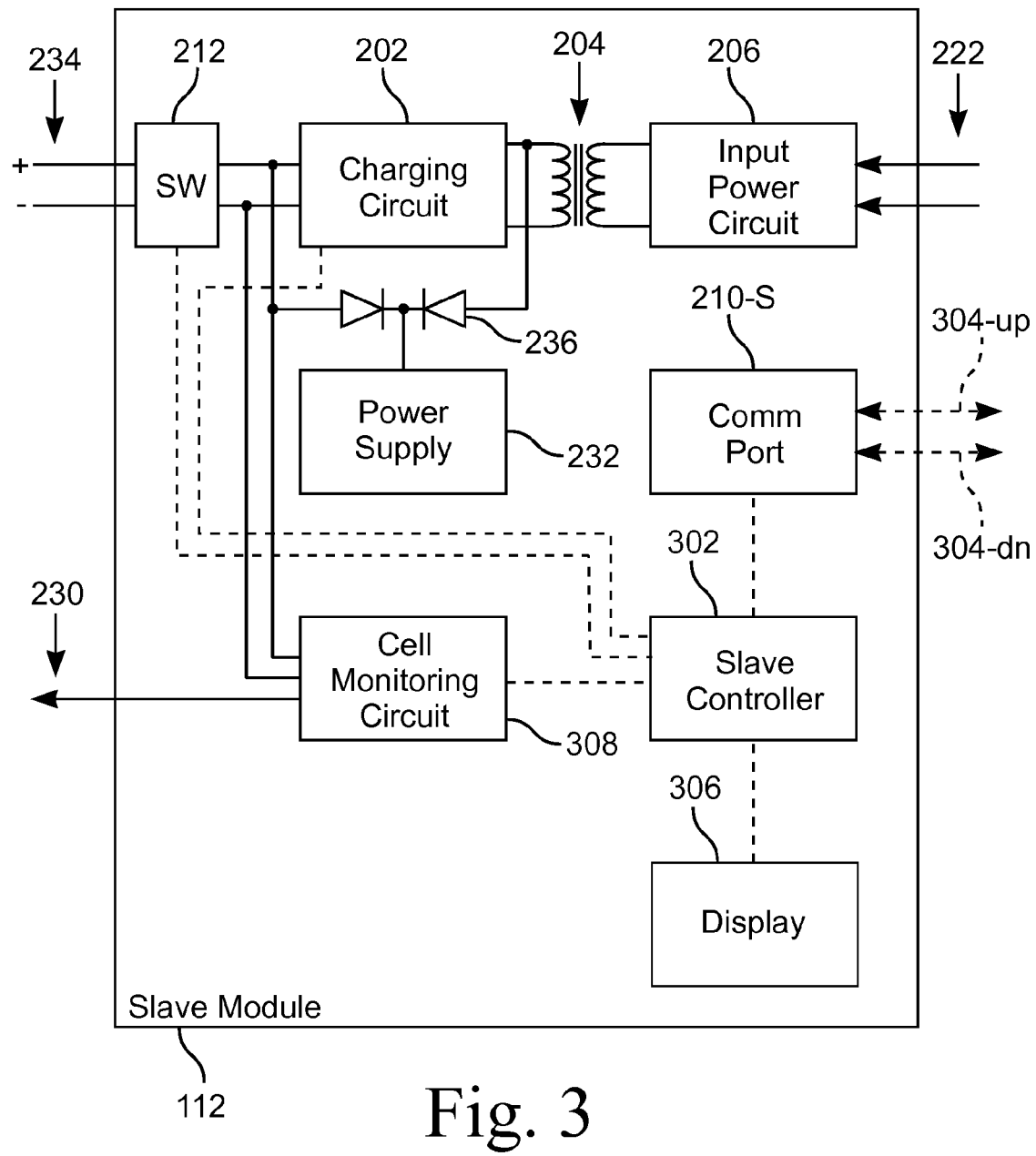
FIG. 3 is a simplified schematic diagram of one embodiment of one of the slave modules.
Figure 4:
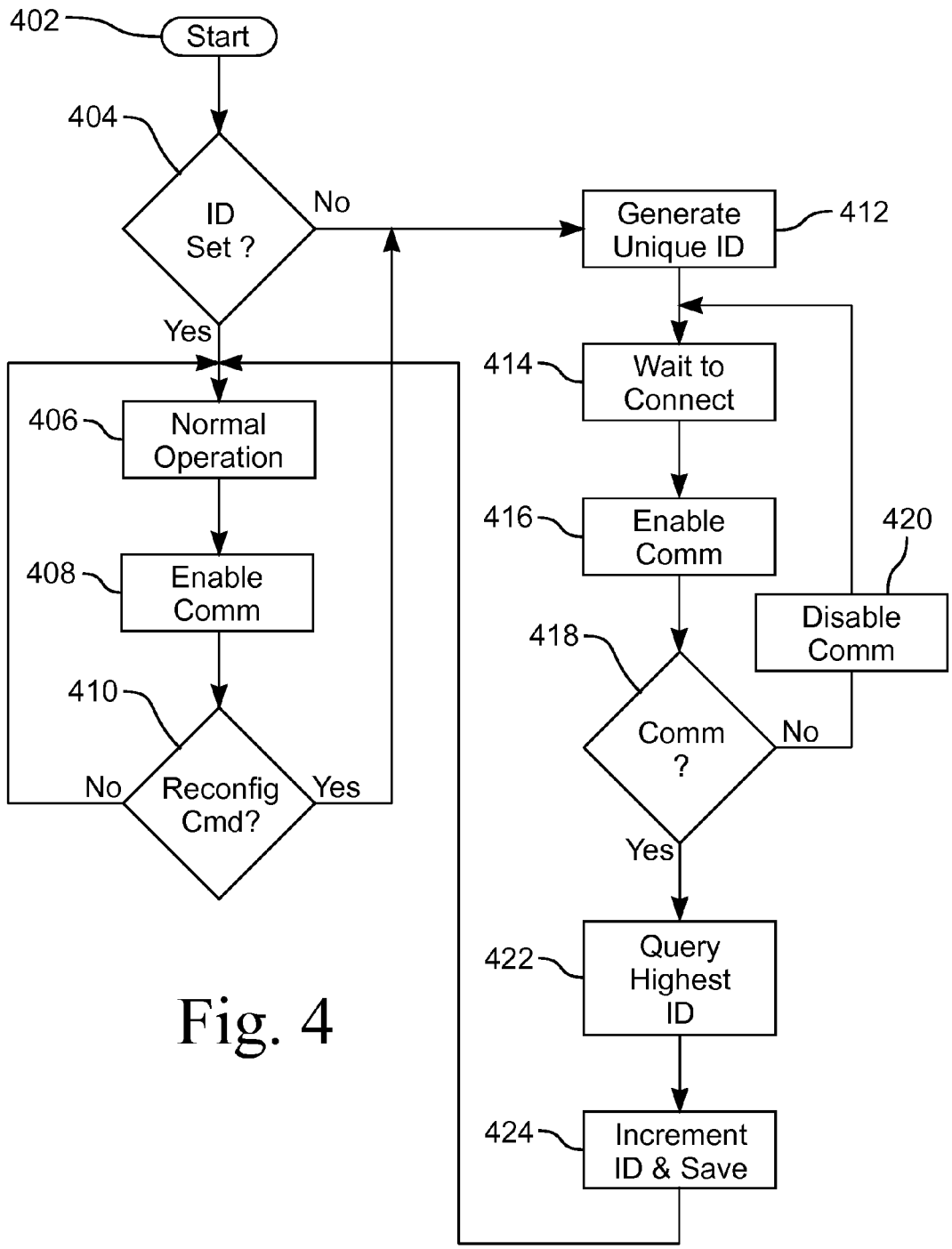
FIG. 4 is functional block diagram of one embodiment of the steps taken to initialize the modules.

Connected to each cell 106 is either a master module 110 or a slave module 112. One cell 108 is selected to be associated with the master module 110. The other cells 108 are each associated with a slave module 112. The slave modules 112 are in communication with the master module 110. The communication connection is wired such that the first cell 108-1 is associated with the master module 110, the second cell 108-2 is associated with the first slave module 112-2, which is assigned the second sequential identifier. The connections continue in this manner until the last cell 108-n is associated with the last slave module 112-n, which is assigned the last n sequential identifier. In one embodiment, the communication connection is a daisy-chained connection, as illustrated in FIGS. 3 and 4, which allows for the automated identification of the slave modules 112. In other embodiments, the communication connections have other configurations, such as a star, ring, or a bus.

The power to the master module 110 and the slave modules 112 is controlled by a transfer switch 104. The transfer switch 104 has multiple states and selectively connects the modules 110, 112 to the battery 106 to an external source 102-A, or to an auxiliary source 102-B or isolates the modules 110, 112 from both the battery 106 and the sources 102. In various embodiments, the transfer switch 104 is an electromechanical relay-type switch or a semiconductor-type switch. In the illustrated embodiment, the transfer switch 104 is shown connected to the hot side or positive potential side of the battery 106. In other embodiments, the transfer switch 104 is located at the earth side of the battery 106 or two transfer switches 104 are positioned on opposite sides of the battery 106. In various embodiments the sources 102 are power sources or power supplies that provide power for charging the battery and/or powering the load. For example, if the battery management system 100 is in an electrically powered vehicle, the external source 102-A is a power supply connected to the ac (alternating current) mains. In various embodiments, the auxiliary source 102-B a solar supply with or without an accumulator or another power source that is configured to remain attached to the battery management system 100, for example, a solar cell array incorporated in the vehicle.

Connecting the sources 102 to the transfer switch 104 are connectors 122-A, 122-B, each of which is an assembly with male and female portions that make a removable electrical connection between the sources 102 and the transfer switch 104. In the illustrated embodiment, the connectors 122 communicate with the master module 110 to signal that the connected source 102-A, 102-B is about to be disconnected from the transfer switch 104. In various embodiments, the connectors 122 each include a switch, contacts, or conductors that open before the power leads open when the connector 122 is being disconnected. In another embodiment, the connectors 122 include a pair of coils that are magnetically connected to establish a link when the connector 122 is mated. For example, the connector 122 is a twist-lock type connector that requires that one portion be twisted relative to the other. The twisting action operates a switch or interrupts a signal path that signals the master module 110. The master module 110 monitors for this signal and when the master module 110 detects that the connector 122 is being disconnected, the master module 110 causes the modules 110, 112 to shut down so as to minimize the power being carried through the connector 122 before the connector 122 breaks the connection. In another embodiment, one or both of the sources 102 monitor the communications through the connector 122 and when the power source 102 determines that the connector 122 is being disconnected, the power source 102 shuts down or interrupts the power flow before the power circuit through the connector 122 is broken. In this way, the connector 122 is not interrupting a large current flow between the source 102 and the transfer switch 104.

In one embodiment, the connectors 122 include signal conductors in addition to power conductors. The signal conductors allow the master module 110 to communicate with the source 102. For example, the external source 102-A communicates its power capacity to the master controller 110, which then uses that information to determine how best to control the slave modules 112 to charge the associated cells 108. Another example is the auxiliary source 102-B is a solar cell array, which communicates its capacity or available wattage to the master controller 110, which then uses that information to determine if the capacity is sufficient to supply power to one or more of the slave modules 112 or otherwise meet the needs of the system 100. If not, the master module 110 communicates with the external source 102-A to determine if that source has sufficient capacity.

One way the master module 110 uses power capacity information is to instruct the slave modules 112 and the master module 100 to limit the charging current for each associated cell 108 in order to not exceed the capacity of the available source 102. Another way is for the master module 110 to control the charging circuits 202 in the modules 110, 112 so that the number of cells 108 being charged at any one time does not exceed the capacity of the connected source 102. For example, if the external source 102 is rated at 40 amperes, the master module 110 instructs the modules 110, 112 for each of the four cells 108 to limit the charging current to 10 amperes, initially. If one cell 108 becomes fully charged and the charging circuit 202 is shut down, the other charging circuits 202 are instructed to increase their charging current accordingly to maintain a maximum charging current without exceeding the capacity of the source 102.

In one embodiment, the battery management system 100 connects only to the external source 102-A and there is no auxiliary source 102-B. In another embodiment, the auxiliary source 102-B is located with the battery 106 and the battery management system 100 and the external source 102-A is typically remotely located from the system 100. The master module 110 monitors for the presence of the external source 102-A. If the source 102-A is present, in one such embodiment, the master module 110 selects one source 102 preferentially over the other source 102 if both sources 102 have sufficient capacity to meet the power requirements of the system 100. For example, the auxiliary source 102-B is selected to supply power to the system 100 if the source 102-B has sufficient capacity to meet the needs of the system 100. If the needs exceed the capacity of the auxiliary source 102-B, the master module 110 causes the transfer switch 104 to connect the external source 102-A to the modules 110, 112. In one embodiment, the auxiliary source 102-B is a solar cell array with a capacity testing device, such as a voltage measurement device or a switched load that measures the instantaneous power-producing capacity of the solar array.

In one embodiment, the external power source 102-A determines that the source 102-A is connected to the battery management system 100 because communications have been established to the master module 110 through the connector 122-A. The power source 102-A, after establishing communications with the master module 110, powers up to a condition in which power is supplied to the transfer switch 104. In a like manner, the external power source 102-A powers down when the external power source 102-A determines that the connector 122 is being disconnected, for example, when communications is lost with the master module 110. In one embodiment, the auxiliary source 102-B responds similarly.

A load 118 and a load disconnect switch 116 in series are connected across the battery 106. The load 118 is any type of electrical load, for example, a motor and controller for a vehicle or remote field-operated equipment. The load disconnect switch 116 is controlled by the master module 110 to isolate the load 118 from the battery. The load disconnect switch 116 is illustrated connected to the earth side of the load 118. In other embodiments the switch 116 is positioned on the other side of the load 118 or a pair of switches 116 are connected on opposite sides of the load 118. The load disconnect switch 116 isolates the load 118 if one or more cells 108 are determined to be operating outside specified limits or if the master module 110 otherwise receives a signal to control the switch 116. In various embodiments, the load disconnect switch 116 is an electromechanical relay or a semiconductor-type switch. In series with the cells 108 is a current sensor 120 that communicates with the master module 110. The current sensor 120, in one embodiment, is a current shunt suitable for the level of current generated by the battery 106.

An auxiliary load 118' and an auxiliary load switch 116' in series are connected across selected cells 108-1, 108-2 of the battery 106. The auxiliary load 118' is any load that does not require the full voltage of the battery 106. For example, when the load 118 is a motor and controller for a vehicle that operates at an elevated voltage, e.g., 48 volts, the auxiliary load 118' includes the radio and other accessories that operate at a lower voltage, e.g., 12 volts. In operation, the transfer switch 104 is in the open state, that is, the transfer switch 104 isolates the battery 106 and the sources 102 from the modules 110, 112. When the voltage of any of the cells 108-1, 108-2 supplying the auxiliary load 118' falls below a first setpoint, the transfer switch 104 is directed, by the master module 110, to the state connecting the battery 106 to the modules 110, 112. The master module 110 and/or the slave module 112-2 that is connected to the cell 108-1, 108-2 with the low voltage charges that cell 108-1, 108-2 to raise its voltage. In this way, the battery 106 and its cells 108 remain serviceable for a longer period because the low cells 108 are prevented from approaching the critical voltage point until almost all the available energy in the battery 106 has been used. Stated another way, some cells 108 are not required to supply as much energy because the cells 108 are not required to supply a portion of the load 118'. The cells 108 that are not required to supply energy to the load 118' are used to supply energy indirectly, through the master and slave modules 110, 112, to the cells that supply energy directly to the load 118', thereby balancing the battery 106. In the embodiment where an auxiliary power source 102-B is connected to the battery management system 100, the master module 110 first causes the transfer switch 104 to connect the auxiliary source 102-B to charge the cell 108 if the source 102-B has sufficient capacity to be effective. If the source 102-B does not have sufficient capacity, the transfer switch 104 connects the battery 106 to the system 100.

In the illustrated embodiment, the battery management system 100 includes a controller 114 in communication with the master module 110. In various embodiments, the controller 114 is an external computer, a dedicated control console, or other controller. For example, if the battery management system 100 is used with an electric powered vehicle, the controller 114 includes the operator console controls, such as the key switch, which is comparable to the ignition switch of a gas powered vehicle. The controller 114 accesses the information available to the master module 110 and provides data storage and display of that information. The controller 114 also provides control signals to the master module 110 for operating and controlling the various features that the master controller 110 controls. In one embodiment, a portion of the control functions are assumed by the controller 114 based on data passed to the controller 114 from the master module 110.

In the illustrated embodiment, the battery management system 100 includes a remote display 124. The remote unit 124 communicates with the master module 110 wirelessly. The remote unit 124 receives status information on the management system 100 and the battery 106. For example, the received data includes the state of charge of the battery 106 and the individual cells 108. The remote unit 124 is a personal device, such as a key fob or a personal data assistant (PDA) or other wireless device, that has a display for presenting the data to a user.

Figure 2:
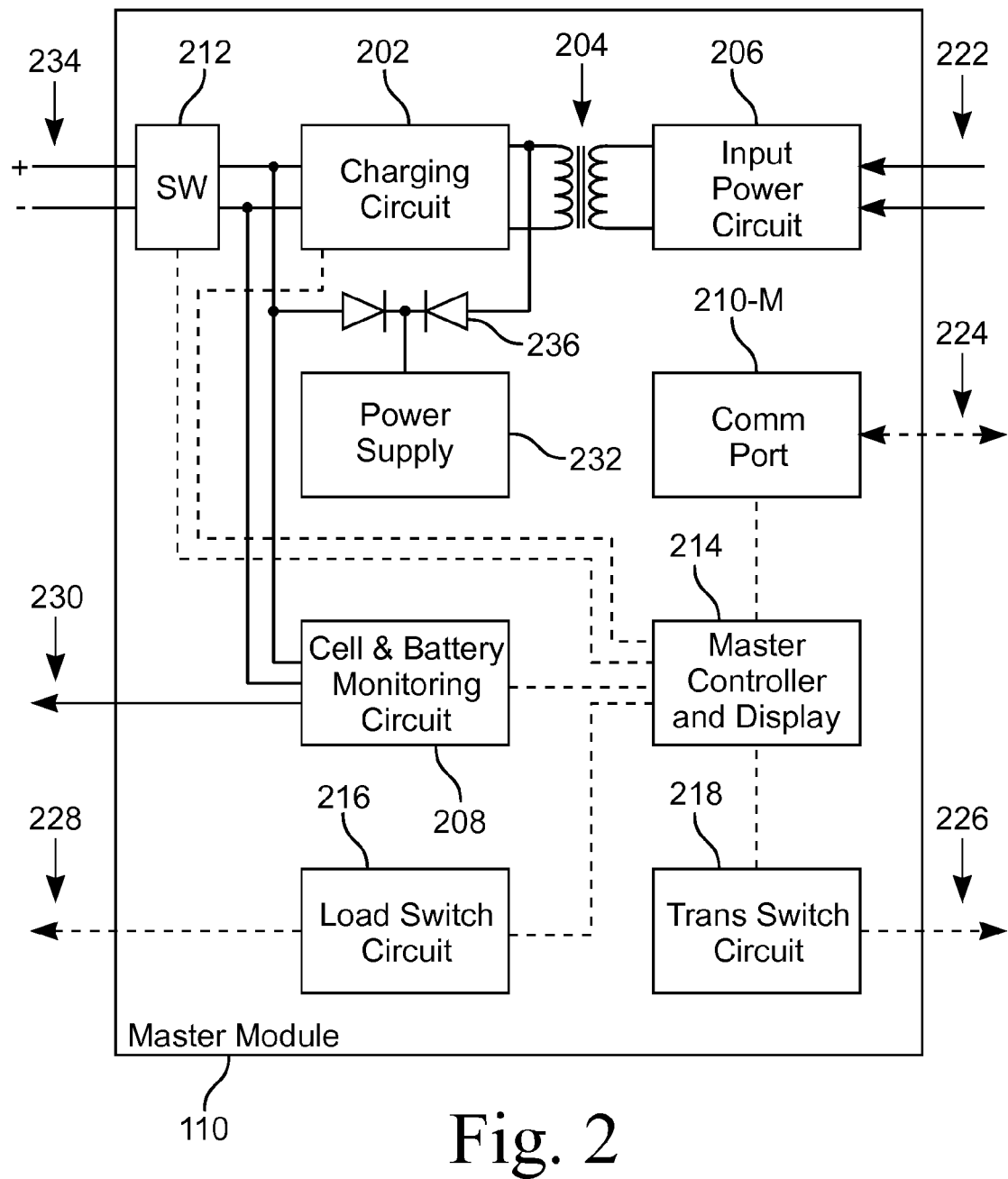
FIG. 2 is a simplified schematic diagram of one embodiment of the master module.

FIG. 2 illustrates a simplified schematic diagram of one embodiment of the master module 110. The master module 110 is configured to charge its associated cell 108-1, to monitor various parameters of that cell 108-1 and the battery 106, to control the load disconnect switch 116 and the transfer switch 104, and to communicate with and control the slave modules 112.

A pair of power leads 222 supply power to the master module 110. The power leads 222 are connected to an input power circuit 206 that is, in turn, connected to a transformer 204 that magnetically couples the power supply to the charging circuit 202. The magnetic coupling provided by the transformer 204 isolates the power supply connected to the power leads 222 from the electrical connections 234 to prevent the cell 108 connected to the connections 234 from shorting out to the next adjacent series connected cell 108. The electrical isolation also avoids problems associated with the various polarities and potentials associated with the cell 108 connected to the cell leads 234. A module power supply 232 provides power to the other components in the master module 110. The power supply 232 receives power from the output of the transformer 204 and/or from the cell 108 through the power leads 234. The two power connections to the power supply 232 are isolated by a pair of diodes 236 that allow current to flow to the power supply 232, but isolate the two power connections from each other. The power supply 232 remains operable regardless of the power leads 222 being connected to a power supply 102, 106.

The charging circuit 202 is connected to a module disconnect switch 212 that is connected to the cell 108 through a pair of leads 234. The module disconnect switch 212 is controlled by the master controller and display unit 214 to isolate the master module 110 from its associated cell 108. In the case where the associated cell 108 has discharged to the point where continued use will damage the cell 108, the master module 110 isolates itself from the cell 108 to remove its parasitic draining of any remaining power that the cell 108 may have left. Additionally, the module disconnect switch 212 also isolates the cell 108 from the master module 110 when the battery 106 is not being used or when another source 102 is not available.

A cell and battery monitoring circuit 208 is electrically connected to the associated cell 108 through the charging leads 234. The circuit 208 senses the voltage level of the cell 108 through these leads 234. The cell and battery monitoring circuit 208 also includes other connections 230 to the battery for monitoring other parameters, for example temperature and/or specific gravity. The cell and battery monitoring circuit 208 also includes a connection 230 to the current sensor 120 that measures the current through the battery 106. The cell and battery monitoring circuit 208 provides data to the master controller and display unit 214. In one embodiment the cell and battery monitoring circuit 208 includes circuitry that converts the input signals associated with the various parameters into an output signal compatible with the master controller and display 214.

The master controller and display unit 214 includes a processor that manages the master module 110 and the slave modules 112. In one embodiment the master controller and display unit 214 provides information to an operator, such as by illuminating display lamps or by providing information on a text and/or graphical display or monitor. In one embodiment, the master controller 214 does not include a display unit portion. In one such embodiment, the master module 110 communicates with a remote unit 124, such as a key fob or a personal data assistant (PDA) or other wireless device. For example, the master controller and display unit 214 includes a transmitter that sends data that is received by the remote unit 124.

In one embodiment, the master controller 214 includes a processor that executes a program or software that communicates with the other internal circuits 202, 208, 212, 216, 218 and other slave modules 112 through the communications port 210-M. The communications port 210-M includes a communication line 224 that starts the daisy chain connected to the slave modules 112. In one embodiment, the communications port 210-M includes a circuit that electrically isolates the communication line 224 from the other components in the master module 110. For example, the communications port 210 has opto-isolators that electrically isolate the communications signals while allowing signal communications to flow. The display portion of the master controller and display unit 214 displays information regarding the status of the master module 110, and also any information sent to the master module 110 from any slave module 112. For example, if the slave module 112-n, connected to the nth cell 108-n, determines that its cell 108-n consistently is underperforming, the slave module 112-n sends information that is displayed indicating that the cell 108-n connected to slave module 112-n must be replaced or serviced.

The load disconnect switch 116 is operated by the load switch circuit 216, which is, in turn, controlled by the master controller 214. The load switch circuit 216 converts the signal from the master controller 214 to another signal suitable for operating the load disconnect switch 116. In various embodiments, the function of the load switch circuit 216 is performed by a separate circuit or is incorporated into one or both of the load disconnect switch 116 and the master controller 214.

The transfer switch 104 is operated by the transfer switch circuit 218, which is, in turn, controlled by the master controller 214. The transfer switch circuit 218 converts the signal from the master controller 214 to another signal suitable for operating the transfer switch 104. In various embodiments, the function of the transfer switch circuit 218 is performed by a separate circuit or is incorporated into one or both of the transfer switch 104 and the master controller 214.

FIG. 3 illustrates a simplified schematic diagram of one embodiment of one of the slave modules 112. As in the master module 110, each slave module 112 is configured to charge its associated cell 108-2 to 108-n, to monitor various parameters of that cell 108-2 to 108-n, and to communicate with the master controller 214 by sending commands via the communications port 210-S. FIG. 3 uses the same reference numbers as used in FIG. 2 for the internal circuit/module functions that are the same as those in FIG. 2.

The slave module 112 includes a pair of power leads 222 that supply power to the slave module 112. The power leads 222 are connected to an input power circuit 206 that is, in turn, connected to a transformer 204 that magnetically couples the power supply to the charging circuit 202. The magnetic coupling provided by the transformer 204 isolates the power supply connected to the power leads 222 from the electrical connections 234 to prevent the cell 108 connected to the connections 234 from shorting out to the next adjacent series connected cell 108. The electrical isolation also avoids problems associated with the various polarities and potentials associated with the cell 108 connected to the cell leads 234. A module power supply 232 provides power to the other components in the slave module 112. The power supply 232 receives power from the output of the transformer 204 and/or from the cell 108 through the power leads 234. The two power connections to the power supply 232 are isolated by a pair of diodes 236 that allow current to flow to the power supply 232, but isolate the two power connections from each other.

The charging circuit 202 is controlled by the slave controller 302. The output of the charging circuit 202 is connected to a module disconnect switch 212 that is connected to the cell 108 with a pair of leads 234. The module disconnect switch 212 is controlled by the slave controller 302 to isolate the slave module 112 from its associated cell 108. The slave controller 302 receives instructions from the master module 110 to operate the module disconnect switch 212.

As in the master module 110, a cell monitoring circuit 308 is electrically connected to the associated cell 108 through the charging leads 234. The circuit 308 senses the voltage level of the cell 108 through these leads 234. The cell monitoring circuit 308 also includes other connections 230 to the battery for monitoring other parameters, for example temperature and/or specific gravity. The cell monitoring circuit 308 provides data to the slave controller 302. In one embodiment the cell monitoring circuit 308 includes circuitry that converts the input signals associated with the various parameters into an output signal compatible with the slave controller 302.

The slave controller 302 evaluates one or more parameters measured by the cell monitoring circuit 308 to determine if the cell 108 has been discharged to the point where continued discharge will damage the cell 108. For example, if the cell voltage drops below a critical voltage point, the cell 108 is considered fully discharged. The slave controller 302 communicates with the master module 110 and provides status information on the cell 108 associated with that slave module 112.

In one embodiment, the slave controller 302 includes a processor that executes a program or software that communicates with the master controller 214 through the communications port 210-S to control the other internal circuits 202, 308, 212. The communications port 210-S includes a pair of communication lines 304 that form a part of the daisy chain connecting the slave modules 112 to the master module 110. In one embodiment, the communications port 210-S includes a switch or other isolation device or circuit that allows the communications port 210-S to communicate with devices 110, 112 downstream in the daisy chain 304-*dn*, but selectively inhibits communication with devices 112 upstream in the daisy chain 304-*up*. In one embodiment, the communications port 210-S includes a circuit that isolates the communication lines 304 from the other components in the slave module 112. For example, the communications port 210 has opto-isolators that electrically isolate the communications signals while allowing signal communications to flow.

In one embodiment, the slave module 112 includes a display 306 that provides visual indication of information. In one such embodiment, the display 306 is controlled by the slave controller 302. The information provided by the display 306, in various embodiments, includes the identification code of the slave module 112, status information of the slave module 112, and status information for the associated cell 108. In one embodiment, the display 306 includes light emitting diodes LEDs that indicate status information for the slave module 112.

In one embodiment, one of the slave modules 112-2 to 112-*n* is designated as a pseudo-master. The pseudo-master is a selected slave module 112 that is configured to replace a master module 110 in the event that the master module 110 becomes, or in the process of becoming, disabled. In such an embodiment, the selected slave module 112 is programmed to take over the functions of the master module 100 by assuming the master role and commanding all the other slave modules 112. If the selected slave module, or pseudo master, 112 determines that the master module 110 is not functioning, the selected slave module 112 initiates and controls an orderly shutdown of the battery management system 100 by initiating commands from the slave controller 302 through the communications port 210-S to all the other slave modules 112.

In one embodiment, the battery management system 100 includes two master modules 110, but only one master module 100 (the primary) is operated as a master module 110. The other module 110 (the secondary) is operated as a slave module 112 until such time that the secondary module 110 determines the primary module 100 is no longer operating properly. In one such embodiment, all the slave modules 112 are master modules 110 operated as slaves. In another such embodiment, the secondary module 110 executes a watchdog routine to monitor the primary module 110.

The master module 110 stores data collected from the slave modules 112. The master module 110 communicates this data to the pseudo-master module 110, 112 so that, in case of need, the module 110, 112 has a duplicate of the data stored by the master module 110. Similarly, in one embodiment, the master module 110 also stores data obtained and used by each slave module 112. When a slave module 112 is replaced during maintenance, the master module 110 uploads the appropriate data to the replacement slave module 112.

Referring to FIGS. 1-3, the load disconnect switch 116 isolates the load 118 from the battery 106 upon a command from the master module 110. The load 118 is disconnected by the switch 116 when any slave module 112 reports to the master module 110 or the master module 110 itself determines that its associated cell 108 have a parameter outside specified limits or the master module 110 receives a signal from an outside source or the controller 114 to disconnect the load 118.

A disconnection signal is also generated by the master module 110 if the master module 110 determines that a slave module 112 is not functioning properly. The master module 110 periodically communicates with each slave module 112. If the communication link is interrupted, such as by a failure of a module 112, or a slave module 112 self-reports a failure condition, the master module 110 isolates the load 118 with the disconnect switch 116.

The master module 110 isolates the load 118 when the module 110 determines that a battery parameter is outside specified limits. For example, the current sensor 120 continuously measures the battery current. If the battery current exceeds a specified limit, the load 118 is isolated to prevent damage to the battery 106. In another example, the voltages of the battery 106 and each cell 108 is continuously measured and the load 118 is isolated when the voltage falls below a specified limit.

When the battery management system 100 is used with an electric powered vehicle, the master module 110 isolates the load 118 from the battery 106 when an external source 102-A is connected to the system 100. Because the external source 102-A is outside the vehicle, the load 118 is isolated to prevent the vehicle from moving while it is tethered by the power cable connecting the external source 102-A to the transfer switch 104.

The master module 110 also isolates the load 118 when the controller 114 so instructs the master module 110. For example, such an instruction is sent when the key switch for an electric-powered vehicle is moved to the off position.

Referring to FIGS. 1-3, the transfer switch 104 is a multistate switch that selectively connects the battery 106 and/or one of the sources 102 to the modules 110, 112. The transfer switch 104 is controlled by the master module 110.

When an external source 102-A is connected to the system 100, the transfer switch 104 connects the external source 102-A to the modules 110, 112. Before the connection is made, the external power source 102-A must satisfy specified parameters, such as having the proper voltage and polarity. In various embodiments, the master module 110 measures these parameters at the transfer switch 104 or at other locations to determine if the external source 102-A is suitable for connection. After the transfer switch 104 connects the external source 102-A to the modules 110, 112, the master module 110 instructs the slave modules 112 to begin charging their respective cells 108. In another embodiment, the parameters are determined by the master module 110 and the external power supply 102-A communicating with each other. In one embodiment, the auxiliary source 102-B operates in a similar manner.

After all the modules 110, 112 determine that their corresponding cells 108 are fully charged, the master module 110 instructs the transfer switch 104 to isolate the sources 102 and the battery 106 from the modules 110, 112. In another embodiment, the transfer switch 104 is also instructed to isolate the battery 106 from the sources 102 and the modules 110, 112.

With the battery 106 providing power to the load 118, if a module 110, 112 determines that a cell 108 is operating outside specified limits, that is, the cell 108 is not balanced with the other cells 108, the transfer switch 104 connects the battery 106 to the modules 110, 112. For example, a cell 108 with a voltage less than a setpoint value or less than an average value of other cell voltages or is not balanced with the other cells 108 or has an energy capacity that is below a specified value, then the master module 110 causes the transfer switch 104 to energize the modules 110, 112 with the battery 106 as a power source and instructs the slave module 112 for that cell 108 to charge the cell 108. In various embodiments, each module 110, 112 determines the energy capacity of its associated cell 108 using a coulomb counting method or other technique. The energy capacity information is transmitted to the master module 110, which determines if the energy capacity of any cell 108 is below a specified value or deviating by a specified amount from the average capacity of the other cells 108. The module 110, 112 associated with the unbalanced cell 108 relies upon the battery 106 for the energy to charge that cell 108. After that cell 108 is brought to the same state of charge as the other cells 108, the master module 110, 112 instructs the module 110, 112 to cease charging and then instructs the transfer switch 104 to isolate the modules 110, 112 from the battery 106.

Referring to FIGS. 1-3, the module disconnect switch 212 isolates the module 110, 112 from its associated cell 108 after the cell 108 is discharged to a specified level, for example, 0% capacity, but before the cell 108 becomes over-discharged. For cells 108 associated with a slave module 112, when a measured parameter of the cell 108 indicates that the cell 108 needs to be isolated, the module 112 communicates that information to the master module 110 and then operates the disconnect switch 212 to remove any parasitic drain caused by the module 112. After an external source 102-A is connected to the system, the master module 110 instructs the module 110, 112 to operate the disconnect switch 212 to reconnect the cell 108 to the module 110, 112. If the auxiliary source 102-B has sufficient capacity to power the module 110, 112, such as a solar array that is exposed to sufficient light, the master module 110 causes the transfer switch 104 to connect the auxiliary source 102-B to the system 100 and instructs the disconnected module 110, 112 to operate the disconnect switch 212 to reconnect the cell 108 to the module 110, 112.

Referring to FIGS. 1-3, the modules 110, 112 have a common power input. The transfer switch 104 connects either the battery 106, the external source 102-A, or the auxiliary source 102-B to all the modules 110, 112. The common power input to the modules 110, 112 is isolated from the other modules 110, 112 and cells 108. In one embodiment, the isolation is accomplished by the magnetic coupling through the transformer 204.

When the transfer switch 104 connects the source 102-A, 102-B to the modules 110, 112, any module 110, 112 that was isolated from its associated cell 108 is powered up and initialized. The initialization includes communicating with the master module 110 and processing any instruction to operate the module disconnect switch 212 to reconnect the associated cell 108 to the module 110, 112.

Referring to FIGS. 1-3, the master controller 214 and the slave controller 302 include a storage component that stores data relevant to the module 110, 112 and its associated cell 108. For example, the cell 108 characteristics are stored, including the cell nominal voltage, the cell critical voltage point, the cell energy capacity. The controllers 214, 302 also store the identification of the module 110, 112 and its associated cell 108.

In addition, the master controller 214 stores data relating to the number and characteristics of the attached slave modules 112 and data relating to the battery 106, for example, the battery nominal voltage, the battery current ratings, and the battery energy capacity. For the case where a slave module 112 must be replaced during maintenance, the master controller 110 initializes the slave module 112 as illustrated in FIG. 4 and the by uploading data to the replacement slave module 112 so that the replacement slave module 112 is able to continue where the failed or replaced module 112 left off.

FIG. 4 illustrates a functional block diagram of one embodiment of the steps taken to initialize the modules 112. When the battery management system 100 is first initialized, the master module 110 identifies each slave module 112 by its order relative to the cell 108 position in the battery 106. For example, the slave module 112-2 associated with the second cell 108-2 has an identification code of 2. The illustrated steps are performed by each slave module 112.

When the system 100 is first energized or when a setup switch is actuated, the process starts 402. Initially, the master module 110 has a preset identification code and the master module 110 maintains its communications line 224 enabled.

Initially, the slave module 112 has its communications line 304 disabled. That is, the slave module 112 does not communicate through the communications port 210-S and the daisy-chain 304 is broken and no signals are able to pass through the slave module 112. The communications port 210-S includes a circuit that prevents communications from passing in either direction between the upstream line 304-*up* and the downstream line 304-*dn* of the daisy-chained communications line 304. In various embodiments, the circuit is implemented with a relay, optical switch, a semiconductor switch, or other types of components and/or circuits.

The first step 404 is for the slave module 112 to determine if its identification code is set. If the slave module 112 has an identification code set, then the next step 406 is for the slave module 112 to begin normal operation, which includes the step 408 of enabling communications through the communications port 210-S. The slave module 112 then performs the step 410 of checking to see if it has received a reconfiguration command from the master module 110. If not, then the slave module 112 enters a continuous loop of normal operation 406 with communications enabled 408 and periodic checks to see if a reconfiguration command has been received 410.

If a reconfiguration command has been received or if the slave module 112 does not have its identification code set, the next step 412 is for the slave module 112 to generate a unique identifier, such as a random number. The random number is considered a unique identifier for each slave module 122 because the pool of generated random numbers is significantly larger than the number of slave modules 112. In another embodiment, each module 110, 112 has a unique serial number, which is a unique identifier and used in place of the random number. Accordingly, the unique identifier differentiates each slave module 112 from every other slave module 112 in the battery management system 100.

After generating the unique identifier, the next step 414 is for the slave module 112 to wait to connect to the communications line 304. After waiting, the next step 416 is for the slave module 112 to enable communications. In one embodiment, communications is enabled on the downstream communications line 304-*dn*. If the slave module 112 establishes downstream communications 418, then that means that either the slave module 112 is associated with the first cell 108 or the slave modules 112 that are downstream have already completed the steps to obtain an identification code.

If the slave module 112 does not establish downstream communications 418, then the next step 420 is to disable communications and loop to the step 414 of wait to connect. In one embodiment, the waiting step 414 waits a time based on a random number. Doing so introduces randomness into the times that the communications line 304 is enabled.

If the slave module 112 establishes communications downstream with the master module 110 or another slave module 112, the next step 422 is to query for the highest identification code that has been assigned. In one embodiment, the step 422 of querying is performed by communicating with the master module 110, which informs the slave module 112 of the last identification code assigned to a slave module 112. In another embodiment, the slave module 112 communications with the next slave module 112 downstream to obtain that module's identification code. The step 424 of incrementing that identification code and saving it is then performed and the slave module 112 then enters a normal operation mode by next performing step 406 of beginning normal operation.

The communication ports 210-S of the slave modules 112 are connected in a daisy-chain pattern with the master module 110 at the beginning of the daisy chain. When each slave module 112 attempts to communicate with the master module 110 at random times (step 406), the slave module 112 will only be successful if any communication ports 210-S between that slave module 112 and the master module 110 are open to communications. The first slave module 112-2 that can communicate with the master module 110 is the slave module 112-2 that is first in line from the master module 110. When that first slave module 112-2 establishes communication 408, the slave module 112-2 is assigned a sequential identification number of two. The sequential identification number corresponds to the position of the associated cell 108 in the battery 106. The first slave module 112-2 keeps its communications port 210-S open and connected after the slave module 112 identified. By keeping the communications open, the next slave module 112 in line on the daisy chain is able to establish communication with the master module 110. The slave modules 112 continue seeking communications until all the slave modules 112 have sequentially established communications and have been identified with a sequential, incremental identifier.

If a slave module 112 is replaced because of failure or other maintenance, the slave module identification setup is re-initiated to identify the new slave module 112, along with re-identifying the other slave modules 112. By using sequential incremented identifiers, the master module 110 need only display the identifier to allow a technician or other maintenance person to quickly identify the cell 108 and/or slave module 112 for servicing. For example, if the master module 110 reports a problem with the cell 108 associated with the slave module 112 having a sequential identifier of five, the service person need only count the fifth cell 108 starting with the first cell 108-1 associated with the master module 110.

Referring to FIGS. 1-4, the battery management system 100 operates by initializing the slave modules 112 as described in FIG. 4. When the slave modules 112 are initialized and identified, the master module 110 switches the transfer switch 104 to the state where the source 102 is connected to the modules 110, 112. In the embodiment where the transfer switch 104 is connected to both an external source 102-A and an auxiliary source 102-B, the master module 110 selects the source 102 that has sufficient capacity to meet the needs of the system 100. In one embodiment, the master module 110 selects the source 102 that is most economical, for example, an auxiliary source 102-B that receives solar power is more economical than an external power source 102-B that is requires a fee per unit power. Another example is an auxiliary source 102-B that is a fuel cell or fuel powered generator, which is more expensive to operate than to purchase power through the external power source 102-A.

Upon receiving power, the modules 110, 112 determine the condition of its associated cell 108 and charges that cell 108 accordingly. The loads 118, 118' may or may not be connected to the battery 106 while it is being charged. The system 100 is controlled by the controller 114 to connect the loads 118, 118' as desired.

As each cell 108 is charged, the associated module 110, 112 turns off its charging circuit 202. When all the cells 108 are charged, the master module 110 operates the transfer switch 104 to the state isolating the modules 110, 112 from both the battery 106 and the sources 102.

If the external power source 102 and the auxiliary source 102-B is not available, or the auxiliary source 102-B does not have sufficient capacity, and one of the modules 110, 112 determines that a cell has reached a first specified discharge level, the module 110, 112 communicates with the master module 110, which operates the transfer switch 104 to the state connecting the battery 106 to the modules 110, 112. The module 110, 112 associated with the partially discharged cell 108 charges that cell 108 using the battery 106 as a power source. In this way, the cells 108 are balanced as the battery 106 is discharged. When any one of the modules 110, 112 determines that a cell has reached a second specified discharge level, the module 110, 112 communicates with the master module 110, which operates the load disconnect switches 116, 116' to isolate the battery 106 from the loads 118, 118'. The associated module 110, 112 operates the module disconnect switch 212 to isolate the associated cell 108 from the module 110, 112, thereby turning off any parasitic load and minimizing the probability that the cell 108 will be damaged. When the external source 102-A is connected to the transfer switch 104, the master module 110 operates the transfer switch 104 to the state connecting the source 102-A to the modules 110, 112 and the modules 110, 112 begin charging their associated cells 108, as appropriate.

If either the external power source 102-A or the auxiliary source 102-B is available with sufficient capacity and one of the modules 110, 112 determines that a cell 108 has reached a first specified discharge level, the master module 110 operates the transfer switch 104 to the state connecting the source 102 to the modules 110, 112 and the module 110, 112 associated with the partially discharged cell 108 charges that cell 108 using the source 102 as a power source. When any one of the modules 110, 112 determines that a cell has reached a second specified discharge level, the module 110, 112 communicates with the master module 110, which operates the load disconnect switches 116, 116' to isolate the battery 106 from the loads 118, 118'. The unloaded battery 106 is then charged by the modules 110, 112.

Figure 5:
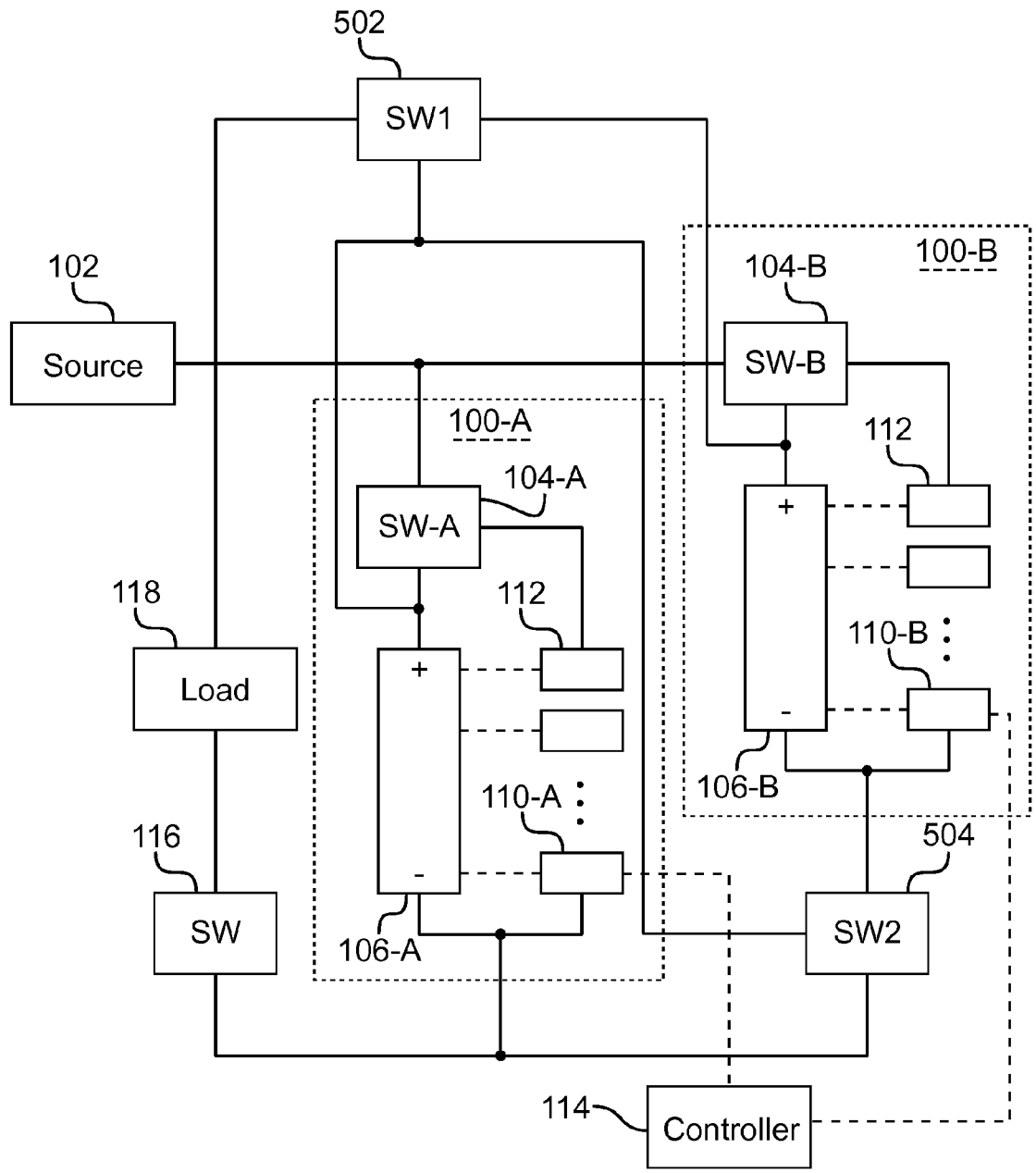
FIG. 5 is a simplified schematic diagram of one embodiment of a scheme connecting two batteries to a single load.

FIG. 5 illustrates a simplified schematic diagram of one embodiment of a scheme connecting two batteries 106-A, 106-B to a single load 118. When multiple batteries 106-A, 106-B are available for connecting to a load 118, it is often desirable to connect those batteries 106-A, 106-B to the load 118 with a configuration that accommodates the load's energy requirements. For example, when greater energy capacity is required, two batteries 106-A, 106-B are connected in parallel and when greater energy potential is required, two batteries 106-A, 106-B are connected in series.

The illustrated configuration includes two independent battery management systems 100-A, 100-B. The first battery 106-A has one end connected directly to the load 118 and disconnect switch 116 and the other end with a first switch (SW1) 502 connected between the load 118 and the first battery 106-A. The second battery 106-B has a pair of switches (SW2 & SW1) 504, 502 connected between the second battery 106-B and the load 118 and disconnect switch 116.

The two switches (SW1 & SW2) 502, 504 are positioned such that to configure the two batteries 106-A, 106-B in parallel, the first switch (SW1) 502 connects the positive end of the first and second batteries 106-A, 106-B to the load 118 and the second switch (SW2) 504 connects the negative end of the second battery 106-B to the load 118 and the disconnect switch 116 and isolates the negative end of the second battery 106-B from the positive end of the first battery 106-A. In this configuration, the energy capacity available to the load 118 is doubled with the two batteries 106-A, 106-B in parallel.

To configure the two batteries 106-A, 106-B in series, the first switch (SW1) 502 isolates positive end of the first battery 106-A. The second switch (SW2) 504 isolates the negative end of the second battery 106-B from the load 118 and the disconnect switch 116 and connects the negative end of the second battery 106-B to the positive end of the first battery 106-A. In this configuration, the potential applied to the load 118 is doubled with the two batteries 106-A, 106-B in series.

In another embodiment, the first battery 106-A is connected to the load 118 by isolating completely the second battery 106-B from the load 118 by opening one or both of the switches (SW1 & SW2) 502, 504. When the first battery 106-A is depleted, the first battery 106-A is isolated by the switches (SW1 & SW2) 502, 504 and the second battery 106-B is connected to the load and the disconnect switch 116 by the switches (SW1 & SW2) 502, 504. In this embodiment, the running time of the load 118 is doubled with the two batteries 106-A, 106-B.

The controller 114 is connected to each system 100-A, 100-B and the two switches (SW1 & SW2) 502, 504. The controller 114 changes the configuration of the multiple batteries 106-A, 106-B to accommodate the changing requirements of the load 118. In other embodiments, the number of batteries 106 varies to accommodate the energy capacity and potential requirements of the load 118.

Figure 6:
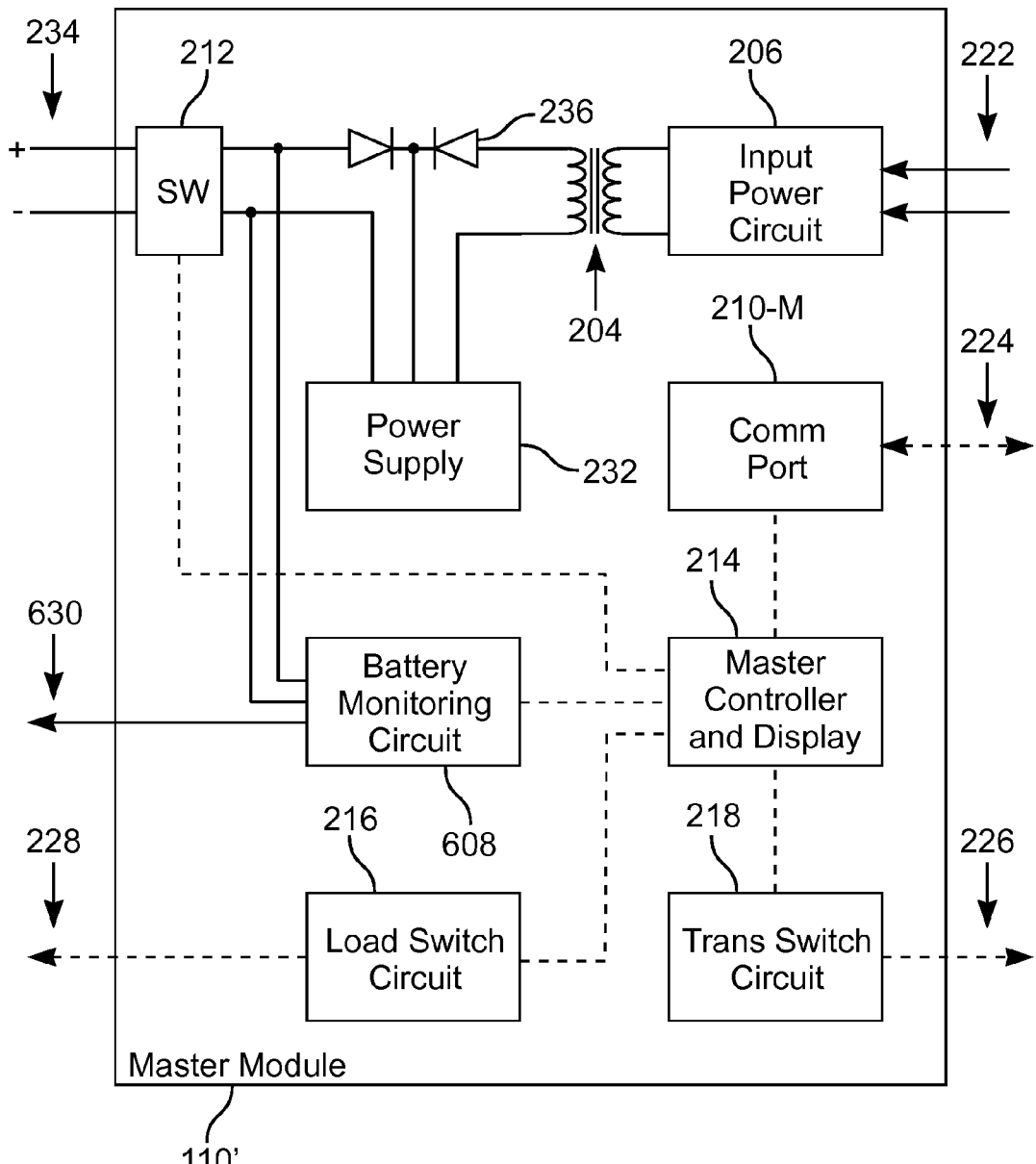
FIG. 6 is a simplified schematic diagram of another embodiment of the master module.

FIG. 6 illustrates a simplified schematic diagram of another embodiment of the master module 100'. The illustrated master module 100' is not associated with a specific cell 108. Instead, the master module is connected to the battery 106, or in various other embodiments, an independent cell or battery. The connection leads 234 for the master module 100' are connected to the battery 106.

The illustrated embodiment of the master module 110' does not include a battery charger 202 nor a cell and battery monitoring circuit 208 because the master module 110' is not associated with a cell 108 that needs monitoring and charging. The input power leads 222 provide power to the input power circuit 206, which supplies a transformer 204. The output of the transformer 204 is connected to the module power supply 232 through an isolation diode 236. The leads 234 connecting the master module 110' to the battery 106 are also connected to the module power supply 232 through another diode 236. The diodes 236 isolate the two power sources.

The master module 110' includes a battery monitoring circuit 608 that monitors parameters of the battery 106. In one embodiment, the battery monitoring circuit 608 has a connection 630 to the current sensor 120 that measures battery current. The battery monitoring circuit 608 determines the state or condition of the battery 108 as a whole. The master module 110' communicates with the slave modules 112 to determine the state or condition of individual cells 108.

FIGS. 1-3, 5, and 6 illustrate simplified schematics. The simplified schematics do not illustrate various connections, for example, power and ground connections to the various components; however, those skilled in the art will recognize the need for such wiring and understand how to wire such a circuit, based on the components ultimately selected for use.

As used herein, the master controller 214 and the slave controllers 302 should be broadly construed to mean any device that accepts inputs and provides outputs based on the inputs, for example an analog control device or a computer or component thereof that executes software, such as a microcontroller or a general purpose computer. In various embodiments, the controllers 214, 302 are a specialized device or a computer that implements the functions. The controllers 214, 302 include input/output (I/O) units for communicating with external devices and a processing unit that varies the output based on one or more input values. A computer-based controller 214, 302 includes a memory medium that stores software and data and a processing unit that executes the software. Those skilled in the art will recognize that the memory medium associated with the computer-based controller 214, 302 can be either internal or external to the processing unit of the processor without departing from the scope and spirit of the present invention.

The input component of the controller 214, 302 receives input from external devices, such as current sensors 120 and temperature sensors. The output component sends output to external devices, such as the various switches 104, 116. The storage component stores data and program code. In one embodiment, the storage component includes random access memory and/or non-volatile memory.

In one embodiment, each of the functions identified herein are performed by one or more software routines executed by the controllers 214, 302. In another embodiment, one or more of the functions identified are performed by hardware and the remainder of the functions are performed by one or more software routines run by the controllers 214, 302. In still another embodiment, the functions are implemented with hardware, with the controllers 214, 302 providing routing and control of the entire integrated system 100.

In one embodiment, the controllers 214, 302 execute software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function.

The battery management system 100 includes various functions. The function of preventing damage to a cell is implemented, in one embodiment, by monitoring one or more parameters of the cell 108 and isolating the cell 108 at or before a critical point of one or more of those monitored parameters is reached. Isolating the cell 108 prevents parasitic power draw from the module 110, 112 draining the cell 108 and potentially damaging the cell 108.

The function of prolonging the service life of a charge is implemented, in one embodiment, by monitoring one or more parameters, for example, the voltage, of each cell 108 when the battery 106 is connected to the load 118 and charging any cell 108 that approaches a critical point of one or more of those parameters. In this way the other cells 108 elevate the weak cell 108 instead of shutting down the battery 106 because one cell 108 is weak, thereby maximizing the operating time of the battery 106.

The function of preventing arcing when disconnecting the source 102 is implemented, in one embodiment, by a connector 122 that allows communication between the master module 110 and the power source 102 before the power connection is broken. In one such embodiment, the master module 110 controls the modules 110, 112 to reduce the load drawn from the source 102 instead of allowing the connector 122 to interrupt the circuit. In another embodiment, the source 102 determines the connector 122 is about to be disconnected and the source 102 shuts down the power to the transfer switch 104.

The function of initializing the slave modules 112 during initial installation or during maintenance replacements is implemented, in one embodiment, by the master module 110 communicating with the slave modules 112, as illustrated in FIG. 4, to assign identification codes to the slave modules 112.

The function of providing a failsafe for the master module 110 is implemented, in one embodiment, by one slave module 112 being designated as a pseudo-master. In another embodiment, the function of providing a failsafe is implemented by having two master modules 110, one operating as a primary and the other as a secondary master module 110.

The function of maintaining battery 106 health under load when one of the sources 102 is connected is implemented, in one embodiment, by operating the master module 110 and the slave modules 112 to continually monitor the cells 108 and charge any cell 108 that is discharged below a specified setpoint. Because the cells 108 are monitored individually, a weak cell 108 is able to be charged before it is damaged or it shuts down the load 118. For the case where the rate of discharge through the load 118 is less than the charge rate of the modules 110, 112, the cells 108 are maintained in a fully charged state. For the case where the rate of discharge through the load 118 is greater than the charge rate of the modules 110, 112, such as when the discharge rate is greater than the capacity of the connected source 102, the battery 106 is gradually discharged with no one cell 108 being depleted before the others. That is, the weakest cells 108 are charged at a maximum rate because the weakest cells 108 determine the point at which the battery 106 must be shut down to prevent damage to the cells 106.

The function of powering a module 110, 112 with the transfer switch 104 isolating the modules 110, 112 is implemented, in one embodiment, by the power supply 232 receiving power from the associated cell 108. In one embodiment, the diodes 236 isolate two power sources: the cell 108 and the power from the input power circuit 206.

The function of paralleling multiple batteries 106-A, 106-B for a single load 118 is implemented, in one embodiment, by two battery management systems 100, one for each battery 106-A, 106-B. The source 102 is connected to both transfer switches 104-A, 104-B. A third transfer switch 502 connects each battery 106-A, 106-B to the load 118, independently or together. A fourth transfer switch 504, in conjunction with the third switch 502, performs the function of connecting the batteries 106-A, 106-B to the load 118 in series or in parallel.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for managing a battery with a plurality of cells wherein each cell is defined as a battery unit, said apparatus for supplying an external load, said apparatus comprising:
   a master module having a battery monitoring circuit configured for monitoring at least one parameter associated with the battery, said master module having a master controller and a master communications port;
   a plurality of slave modules each having a charger, a cell monitoring circuit, a module disconnect switch, and a slave communications port, each one of said chargers configured to be electrically connected to an associated cell through said module disconnect switch, each one of said slave modules configured to be selectively powered by at least one of said associated cell and an external power source, each one of said slave modules electrically isolated from said external power source when said external power source is powering said corresponding slave module, each one of said slave communications ports configured to communicate with said master communications port;

a transfer switch operatively connected to said master module, said transfer switch having a first state supplying power to said plurality of slave modules from said external power source, said transfer switch having a second state supplying power to said plurality of slave modules from the battery, said master controller causing said transfer switch to operate; and a load disconnect switch operatively connected to said master module, said load disconnect switch configured to be electrically connected to the external load to isolate the external load from the battery, said master module causing said load disconnect switch to isolate said load from the battery when any one of said associated cells has a first operating parameter with a first specified value as determined by said cell monitoring circuit.

2. The apparatus of claim 1 further including a connector between said external power source and said transfer switch, said connector being releasable.

3. The apparatus of claim 2 wherein said connector communicates a connector status with said master module, said connector status including information that said external power source is about to be disconnected from said transfer switch, and said master module causing said transfer switch to disconnect said external power source before said connector breaks an electrical connection between said external power source and said transfer switch.

4. The apparatus of claim 1 further including a remote unit communicating with said master module, said remote unit receiving a set of data from said master module, said remote unit configured to display selected portions of said set of data.

5. The apparatus of claim 1 wherein said master module initializes each one of said plurality of slave modules with a unique identification based on an identification of said associated cell.

6. The apparatus of claim 1 wherein said module disconnect switch operates to isolate said associated cell from a corresponding slave module when said associated cell has a first operating parameter with a specified value.

7. The apparatus of claim 1 wherein said charger of one of said plurality of slave modules is energized to charge said associated cell after said cell monitoring circuit detects a first operating parameter with a specified value and said master module causes said transfer switch to be in said second state.

8. The apparatus of claim 1 further including an auxiliary power source, said transfer switch having a third state supplying power to said plurality of slave modules from said auxiliary power source, said master module causing said transfer switch to be in said third state when said master module determines that said auxiliary source has sufficient capacity.

9. An apparatus for managing a battery with a plurality of cells wherein each cell is defined as a battery unit, said apparatus comprising:

a disconnect switch configured to be electrically connected to an associated cell;

a charger configured to be electrically connected to said associated cell through said disconnect switch, said charger configured to be powered by a power supply that is electrically isolated from said charger, said power supply connected to said charger from a transfer switch that is configured to selectively connect one of an external source and the battery to said charger;

a power input receiving power from said associated cell, said power input disabled when said charger is energized by said power supply;

a monitoring circuit configured to monitor at least one parameter of said associated cell, said disconnect switch operating to isolate said associated cell when said monitoring circuit determines said associated cell has a first operating parameter with a first specified value; and a communications port configured to communicate a set of data to a master module, said set of data including said at least one parameter of said associated cell;

wherein said disconnect switch, said power input, said charging circuit, said cell monitoring circuit, and said communications port define a slave module.

10. The apparatus of claim 9 wherein said first specified value is associated with a critical voltage point of said associated cell.

11. The apparatus of claim 9 further including a controller configured to operate said disconnect switch to isolate said associated cell.

12. The apparatus of claim 9 wherein said charger provides a charging current to said associated cell when a second setpoint has been reached and said power supply is connected to the battery.

13. The apparatus of claim 9 further including a master module having a battery monitoring circuit, said master module communicating with said slave module and said transfer switch.

14. The apparatus of claim 13 wherein said master module is configured to operate said transfer switch to connect the battery to said charger when said associated cell has a second operating parameter with a second specified value.

15. The apparatus of claim 13 wherein said master module uniquely identifies said slave module based on an identification of said associated cell.

16. An apparatus for managing a battery with a plurality of cells, said apparatus comprising:

a plurality of slave modules each configured to electrically connect to an associated cell of the battery, each one of said plurality of slave modules including a charger configured to charge said associated cell, each one of said plurality of slave modules configured to monitor a condition of said associated cell, each one of said plurality of slave modules configured to isolate said associated cell from said one of said plurality of slave modules when said associated cell has a first operating parameter with a first specified value as determined by said cell monitoring circuit;

a transfer switch connected to each one of said plurality of slave modules, said transfer switch configured to connect to an external power source, said transfer switch configured to connect to the battery, said transfer switch having a first state connecting said external power source to said plurality of slave modules, said transfer switch having a second state connecting the battery to said plurality of slave modules;

a load switch configured to disconnect a load from the battery; and a master module in communication with said plurality of slave modules, said master module causing said load switch to disconnect said load when one of said plurality of slave modules signals to said master module that a corresponding one of said associated cells has said first operating parameter with said first specified value, said master module causing said transfer switch to be in said first state when said master module detects that said external power source is connected to said transfer switch.

17. The apparatus of claim 16, when one of said plurality of slave modules signals to said master module that said associated cell has a second operating parameter with a second specified value, said master module causes said transfer switch to be in said second state and said one of said plurality of slave modules charges said associated cell.

18. The apparatus of claim 16, when said transfer switch is in said second state and when one of said plurality of slave modules signals to said master module that said associated cell has a second operating parameter with a second specified value, said master module commands said one of said plurality of slave modules to charge said associated cell.

19. The apparatus of claim 16 wherein said master module causes said load switch to disconnect said load from the battery when any one of said associated cells has said first operating parameter with said first specified value.

20. The apparatus of claim 16 wherein said master module initializes each one of said plurality of slave modules with a unique identification based on an identification of said associated cell.

21. The apparatus of claim 16 further including a remote unit communicating with said master module, said remote unit receiving a set of data from said master module, said remote unit configured to display selected portions of said set of data.

22. The apparatus of claim 16 wherein said master module determines a capacity of said external power source, and said master module causing said plurality of slave modules to charge each said associated cell so as not to exceed said capacity of said external power source.

* * * * *